United States Patent
Tajika

(10) Patent No.: US 12,255,726 B2
(45) Date of Patent: Mar. 18, 2025

(54) COMMUNICATION CONTROL DEVICE, COMPUTER-READABLE STORAGE MEDIUM, SYSTEM AND CONTROL METHOD

(71) Applicant: SoftBank Corp., Tokyo (JP)

(72) Inventor: Akihiko Tajika, Saitama (JP)

(73) Assignee: SoftBank Corp., Tokyo (JP)

( * ) Notice: Subject to any disclaimer, the term of this patent is extended or adjusted under 35 U.S.C. 154(b) by 817 days.

(21) Appl. No.: 17/478,801

(22) Filed: Sep. 17, 2021

(65) Prior Publication Data

US 2022/0060248 A1     Feb. 24, 2022

Related U.S. Application Data

(63) Continuation of application No. PCT/JP2020/002940, filed on Jan. 28, 2020.

(30) Foreign Application Priority Data

Mar. 19, 2019   (JP) ................................ 2019-051181

(51) Int. Cl.
   *H04B 7/185*  (2006.01)
   *H04W 16/28*  (2009.01)
   *H04W 84/06*  (2009.01)

(52) U.S. Cl.
   CPC ..... *H04B 7/18504* (2013.01); *H04B 7/18506* (2013.01); *H04W 16/28* (2013.01); *H04W 84/06* (2013.01)

(58) Field of Classification Search
   CPC .. H04B 7/18513; H04B 7/18504; H04B 7/01; H04B 7/18519; H04B 7/195;
   (Continued)

(56) References Cited

U.S. PATENT DOCUMENTS 6,233,456 B1   5/2001   Schiff
6,813,257 B1   11/2004  Emmons, Jr.
(Continued)

FOREIGN PATENT DOCUMENTS

JP   2002118873 A   4/2002
JP   2002211496 A   7/2002
(Continued)

OTHER PUBLICATIONS

Extended European Search Report for International Application No. 20772622.5 issued by the European Patent Office on Nov. 23, 2022.
(Continued)

*Primary Examiner* — Ajibola A Akinyemi

(57) ABSTRACT

Provided is a communication control apparatus configured to control communication of a flying body configured to form a wireless communication area by applying a beam toward the ground to provide wireless communication service for a user terminal in the wireless communication area. The communication control apparatus comprises an inner area forming unit configured to form an inner wireless communication area having a radius of about 100 km or shorter; and an outer area forming unit configured to form, on an outer side of the inner wireless communication area, an outer wireless communication area constituted by an outer peripheral cell, the outer peripheral cell having a radius of about 50 km or shorter.

24 Claims, 18 Drawing Sheets

(58) Field of Classification Search
CPC .. H04B 7/024; H04B 7/18506; H04B 7/0617; H04B 7/18521; H04B 7/1851; H04B 7/18541; H04B 7/18517
USPC ........................................................ 455/11.1
See application file for complete search history.

(56) References Cited

U.S. PATENT DOCUMENTS

| | | | |
|---|---|---|---|
| 2017/0163336 A1 | 6/2017 | Jalali | |
| 2017/0188278 A1 | 6/2017 | Ohta | |
| 2017/0237482 A1 | 8/2017 | Noerpel | |
| 2021/0391917 A1* | 12/2021 | Morozs | H04B 7/18504 |

FOREIGN PATENT DOCUMENTS

| | | | |
|---|---|---|---|
| JP | 2002246972 A | 8/2002 |
| JP | 2007306583 A | 11/2007 |
| WO | 2016056075 A1 | 4/2016 |

OTHER PUBLICATIONS

Office Action issued for counterpart Japanese Application No. 2019-051181, issued by the Japan Patent Office on Sep. 6, 2022 (drafted on Aug. 31, 2022).
International Preliminary Report on Patentability for International Application No. PCT/JP2020/002940, issued by the International Bureau of WIPO on Sep. 16, 2021.

* cited by examiner

COMMUNICATION CONTROL DEVICE, COMPUTER-READABLE STORAGE MEDIUM, SYSTEM AND CONTROL METHOD

The contents of the following Japanese patent application (s) are incorporated herein by reference:
NO. 2019-051181 filed in JP on Mar. 19, 2019
NO. PCT/JP2020/002940 filed in WO on Jan. 28, 2020

BACKGROUND

1. Technical Field

The present invention relates to a communication control apparatus, a computer-readable storage medium, a system and a control method.

2. Related Art

Known is a flying body that includes an antenna and flies in the stratosphere, so as to provide a stratosphere platform (for example, refer to Patent Document 1).

CITATION LIST

Patent Document

Patent Document 1: Japanese Patent Application Publication No. 2002-211496

DESCRIPTION OF EXEMPLARY EMBODIMENTS

When forming a wireless communication area on the ground, it is necessary to comply with standards of 3GPP (3rd Generation Partnership Project), although there are exceptions. For example, in timing advance regulations in 3GPP, the distance from a wireless base station to a user terminal is up to about 100 km. It is preferable to provide technology by which it is possible to widen a range that can be covered by each flying body while complying with the regulations in 3GPP.

Hereinafter, the present invention will be described through embodiments of the invention. However, the following embodiments do not limit the invention defined in the claims. Also, all combinations of features described in the embodiments are not necessarily essential to solutions of the invention.

Figure 1:
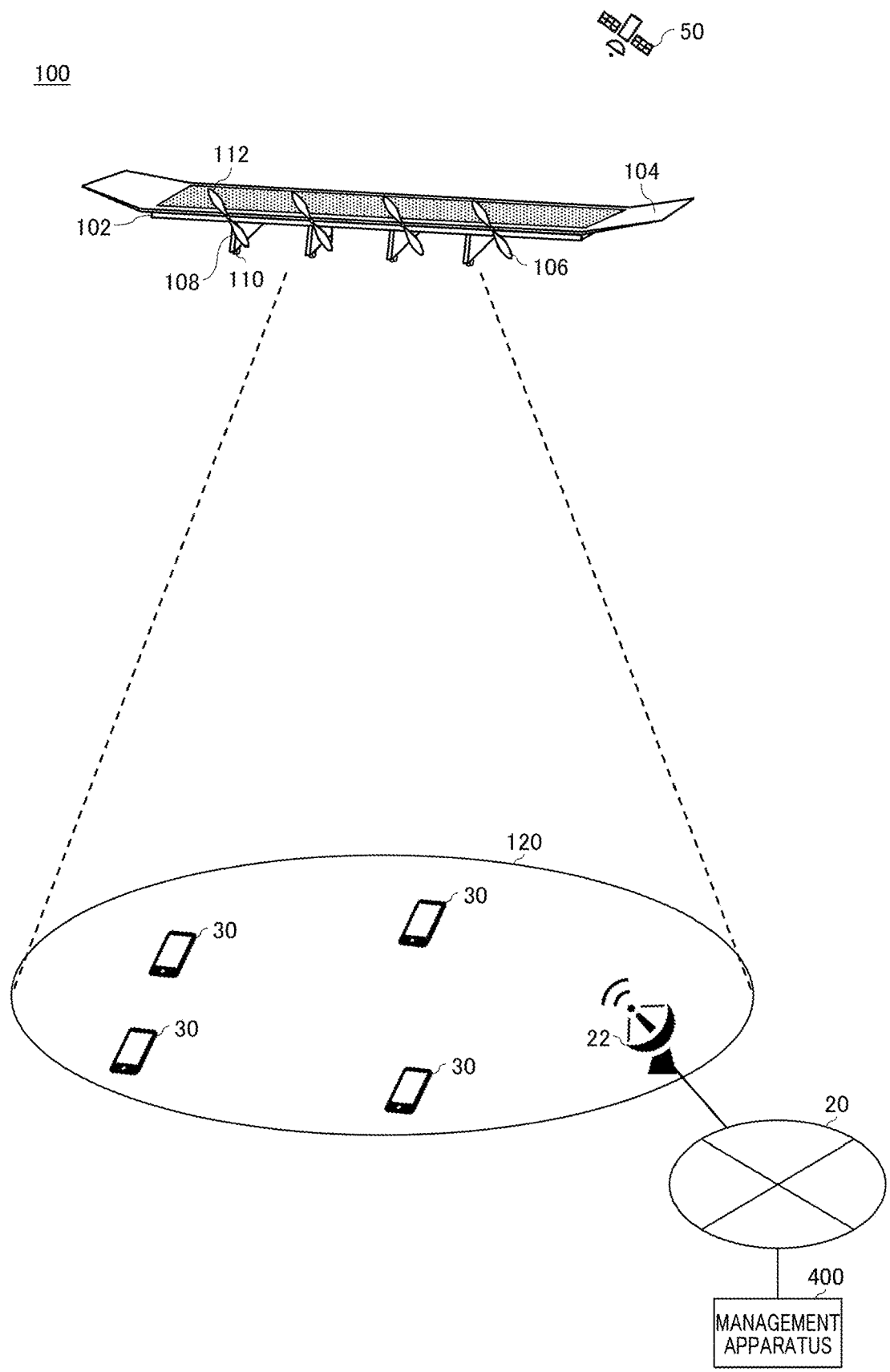
FIG. 1 schematically shows an example of a flying body 100.

FIG. 1 schematically shows an example of a flying body 100. The flying body 100 includes a main body 102, a main wing 104, a propeller 106, a skid 108, a wheel 110 and a solar cell panel 112.

The main body 102 includes a battery, an antenna, a flying control apparatus, and a communication control apparatus, which are not shown. The battery is configured to store electric power generated by the solar cell panel 112. The flying control apparatus is configured to control flying of the flying body 100. The flying control apparatus is configured to cause the flying body 100 to fly by rotating the propeller 106 with the electric power stored in the battery, for example. The communication control apparatus is configured to form a wireless communication area 120 on the ground by using the antenna to provide wireless communication service for a user terminal 30 in the wireless communication area 120. The communication control apparatus and the flying control apparatus may be integrally formed.

The flying body 100 is configured to fly in the stratosphere to provide wireless communication service for the user terminal 30 on the ground, for example. The flying body 100 may function as a stratosphere platform.

The user terminal 30 may be any terminal as long as it is a communication terminal capable of communicating with the flying body 100. For example, the user terminal 30 is a mobile phone such as a smart phone. The user terminal 30 may also be a tablet terminal, a PC (Personal Computer) and the like. The user terminal 30 may also be a so-called IoT (Internet of Thing) device. Examples of the IoT device may include various sensors, various actuators and the like. The user terminal 30 may include all things corresponding to a so-called IoE (Internet of Everything).

The flying body 100 is configured to cover a ground area of a cover target by the wireless communication area 120 while circling over the ground area, for example. The circling of the flying body 100 over the ground area may also be referred to as stationary flying. The flying body 100 is also configured to cover the entire ground area by moving over the ground area while covering a part of the ground area of a cover target by the wireless communication area 120, for example.

The flying body 100 is configured to provide wireless communication service for the user terminal 30 by relaying communication between the user terminal 30 and a network 20 on the ground, for example. The network 20 may be any network, and may include, for example, at least any one of the Internet, a mobile communication network such as so-called 3G (3rd Generation), LTE (Long Term Evolution), 4G (4th Generation) and 5G (5th Generation), a public wireless LAN (Local Area Network), or a dedicated network.

The flying body 100 is configured to communicate with the network 20 on the ground via a gateway 22 in the wireless communication area 120 among gateways 22 arranged in regions on the ground, for example. The flying body 100 is also configured to communicate with the network 20 on the ground via a communication satellite 50, for example. In this case, the flying body 100 has an antenna for communicating with the communication satellite 50.

The flying body 100 may be controlled by a management apparatus 400 on the ground. The flying body 100 is configured to fly or to form the wireless communication area 120, according to an instruction transmitted via the network 20 and the gateway 22 by the management apparatus 400, for example. The management apparatus 400 may be configured to transmit an instruction to the flying body 100 via the communication satellite 50.

Figure 2:
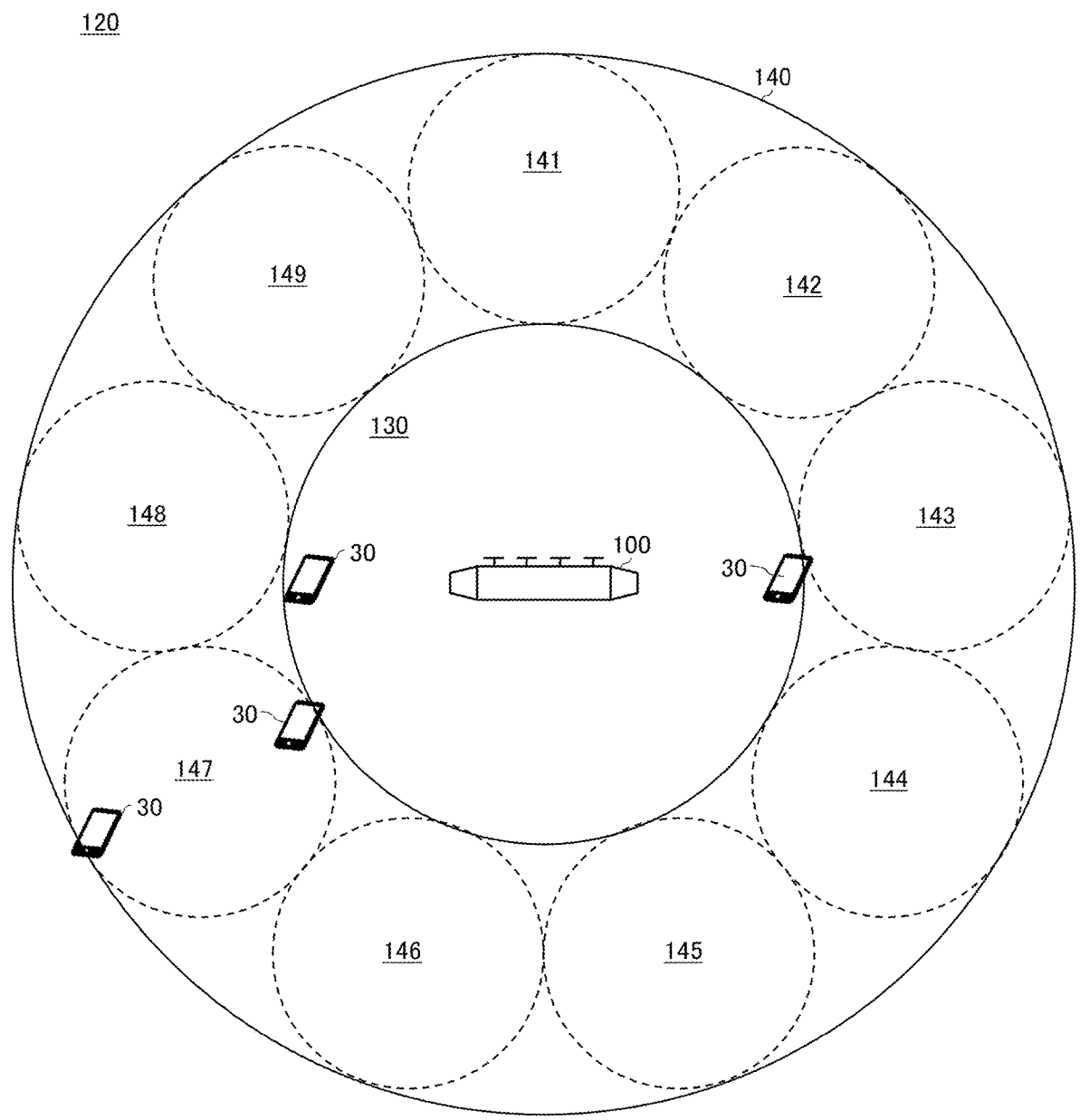
FIG. 2 schematically shows an example of a wireless communication area 120 that is formed by the flying body 100.

FIG. 2 schematically shows an example of the wireless communication area 120 that is formed by the flying body 100. The wireless communication area 120 exemplified in FIG. 2 is constituted by an inner wireless communication area 130 and an outer wireless communication area 140.

When forming the wireless communication area 120 on the ground, it is necessary to comply with standards of 3GPP (3rd Generation Partnership Project), although there are exceptions. In timing advance regulations in 3GPP, a distance from a wireless base station to a user terminal is up to about 100 km, and the flying body 100 can form the inner wireless communication area 130 having a radius of up to about 100 km.

For example, when covering one large ground area by a plurality of flying bodies 100, the greater the size of a wireless communication area formed by each flying body 100 is, the smaller the number of the flying bodies 100 can be. For example, when an area of a wireless communication area that is formed by each flying body 100 is quadrupled, the entire ground area can be covered at a quarter cost. Not only the number of the flying bodies becomes a quarter but also the operating cost becomes accordingly a quarter.

Therefore, the flying body 100 of the present embodiment is configured to form, on an outer side of the inner wireless communication area 130, the outer wireless communication area 140 constituted by cells each having a radius of up to about 50 km. Such cells arranged on the outer periphery of the inner wireless communication area 130 may also be referred to as outer peripheral cells. In FIG. 2, nine outer peripheral cells 141, 142, 143, 144, 145, 146, 147, 148 and 149 are exemplified. However, the number of the outer peripheral cells is not limited thereto.

Since the user terminals in the same cell randomly communicate, it is necessary to match a communication timing according to a distance from the wireless base station. According to the 3GPP regulations, a distance between the user terminals in one cell is limited to up to about 100 km due to such a limitation. Therefore, although a radius of the inner wireless communication area 130 cannot be set to exceed 100 km, it is permitted to form a cell in which the distance between the user terminals in one cell is up to within 100 km, even in a position 100 km or longer distant from the wireless base station. Accordingly, as exemplified in FIG. 2, it is permitted to form the outer peripheral cells each having a radius of up to about 50 km, on the outer side of the inner wireless communication area 130 having a radius of up to about 100 km.

For example, in a case where the radius of the inner wireless communication area 130 is 100 km and the radii of the nine outer peripheral cells 141, 142, 143, 144, 145, 146, 147, 148 and 149 are 50 km, the distance between the flying body 100 and the user terminal 30 in the inner wireless communication area 130 is up to 100 km, which allows for compliance with the standards of 3GPP. In addition, for example, although a distance between the flying body 100 and the outer peripheral cell 147 exceeds 100 km, a distance between the user terminals 30 in the outer peripheral cell 147 is up to 100 km, which allows for compliance with the standards of 3GPP.

Figure 3:
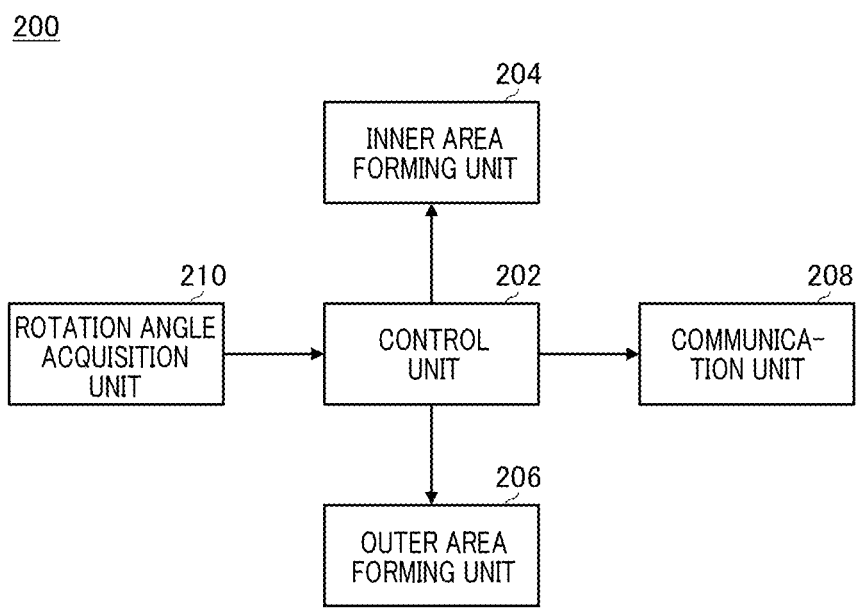
FIG. 3 schematically shows an example of a functional configuration of a communication control apparatus 200.

FIG. 3 schematically shows an example of a functional configuration of a communication control apparatus 200. The communication control apparatus 200 includes a control unit 202, an inner area forming unit 204, an outer area forming unit 206, a communication unit 208 and a rotation angle acquisition unit 210. Note that, it is not necessarily required for the communication control apparatus 200 to have all the configurations.

The control unit 202 is configured to execute various controls. For example, when forming the wireless communication area 120, the control unit 202 causes the inner area forming unit 204 to form the inner wireless communication area 130 and causes the outer area forming unit 206 to form the outer wireless communication area 140.

The inner area forming unit 204 is configured to form the inner wireless communication area 130 on the ground by causing the antenna included on the flying body 100 to apply a beam toward the ground. The inner area forming unit 204 may be configured to form the inner wireless communication area 130 having a radius of 100 km or shorter.

The inner area forming unit 204 may be configured to form the inner wireless communication area 130 whose radius is equal to or longer than a predetermined distance and is about 100 km or shorter. The predetermined distance may be any distance among distances shorter than 100 km. The predetermined distance may be determined in any unit such as a km unit, a m unit, a cm unit and a mm unit. About 100 km may be a range of +several cm, −several cm, +several tens cm, −several tens cm, +several m, −several m, +several tens m, −several tens m, +several hundred m, −several hundred m, +several km, −several km and the like with respect to 100 km.

The inner area forming unit 204 is configured to form the inner wireless communication area 130 having a radius of 100 km, for example. The inner area forming unit 204 may be configured to adjust a beam for forming the inner wireless communication area 130 so that the radius of the inner wireless communication area 130 does not exceed 100 km.

The inner area forming unit 204 may be configured to form the inner wireless communication area 130 constituted by a plurality of cells. The inner area forming unit 204 is configured to form the inner wireless communication area 130 constituted by a center cell and a plurality of cells surrounding the center cell, for example. The cells arranged on an inner periphery of the inner wireless communication area 130, such as the plurality of cells surrounding the center cell, may be referred to as inner peripheral cells. The inner area forming unit 204 may be configured to form the inner wireless communication area 130 constituted by three inner peripheral cells.

The outer area forming unit 206 is configured to form the outer wireless communication area 140 on the ground by causing the antenna included on the flying body 100 to apply a beam toward the ground. The outer area forming unit 206 may be configured to form the outer wireless communication area 140 constituted by an outer peripheral cell having a radius of 50 km or shorter.

The outer area forming unit 206 may be configured to form the outer wireless communication area 140 constituted by an outer peripheral cell whose radius is equal to or longer than a predetermined distance and is 50 km or shorter. The predetermined distance may be any distance among distances shorter than 50 km. The predetermined distance may be determined in any unit such as a km unit, a m unit, a cm unit and a mm unit.

The outer area forming unit 206 is configured to form the outer wireless communication area 140 constituted by an outer peripheral cell having a radius of 50 km, for example. The outer area forming unit 206 may be configured to adjust a beam for forming the outer peripheral cell so that the radius of the outer peripheral cell does not exceed 50 km.

The outer area forming unit 206 may be configured to form, on the outer side of the inner wireless communication area 130, the outer wireless communication area 140 constituted by a plurality of outer peripheral cells. The outer area forming unit 206 may be configured to form the outer wireless communication area 140 surrounding the inner wireless communication area 130. The outer area forming unit 206 may be configured to form the outer wireless communication area 140 surrounding the entire inner wireless communication area 130. Note that, the outer area forming unit 206 may be configured to form the outer wireless communication area 140 constituted by one outer peripheral cell.

The communication unit 208 is configured to perform communication via the wireless communication area 120 formed by the inner area forming unit 204 and the outer area forming unit 206. The communication unit 208 is configured to wirelessly communicate with the user terminal 30 in the wireless communication area 120. The communication unit 208 is also configured to wirelessly communicate with the gateway 22 in the wireless communication area 120. The communication unit 208 may also be configured to wirelessly communicate with the communication satellite 50.

The rotation angle acquisition unit 210 is configured to acquire a rotation angle in the lateral direction of the flying body 100. The rotation angle in the lateral direction of the flying body 100 may be a rotation angle in a horizontal direction of the flying body 100. The rotation angle in the lateral direction of the flying body 100 may also be a so-called left-right swing angle of the flying body 100. The rotation angle acquisition unit 210 may be configured to acquire the rotation angle in the lateral direction of the flying body 100 from the flying control apparatus configured to control flying of the flying body 100.

The outer area forming unit 206 may be configured to change directions of a plurality of beams for forming a plurality of outer peripheral cells, so as to prevent the plurality of outer peripheral cells respectively covering a plurality of ground areas from being moved when the flying body 100 rotates in the lateral direction. The outer area forming unit 206 may be configured to switch the ground areas respectively covered by the plurality of outer peripheral cells each time the flying body 100 rotates in the lateral direction by a predetermined angle. The outer area forming unit 206 may be configured to change a direction of a beam for forming a first cell so that, when the flying body 100 rotates in a first lateral direction by a predetermined angle, the first cell that has been covering a first ground area switches to cover a second ground area adjacent to the first ground area in the first lateral direction.

In a case where the inner wireless communication area 130 constituted by a plurality of cells is formed, the inner area forming unit 204 may be configured to change directions of beams for forming a plurality of inner peripheral cells, so as to prevent the plurality of inner peripheral cells respectively covering a plurality of ground areas from being moved when the flying body 100 rotates in the lateral direction. The inner area forming unit 204 may be configured to switch ground areas respectively covered by a plurality of inner peripheral cells each time the flying body 100 rotates in the lateral direction by a predetermined angle. The inner area forming unit 204 may be configured to change a direction of a beam for forming a first inner peripheral cell configured to cover a first ground area so that, when the flying body 100 rotates in a first lateral direction by a predetermined angle, the first inner peripheral cell that has been covering a first ground area switches to cover a second ground area adjacent to the first ground area in the first lateral direction.

Figure 4:
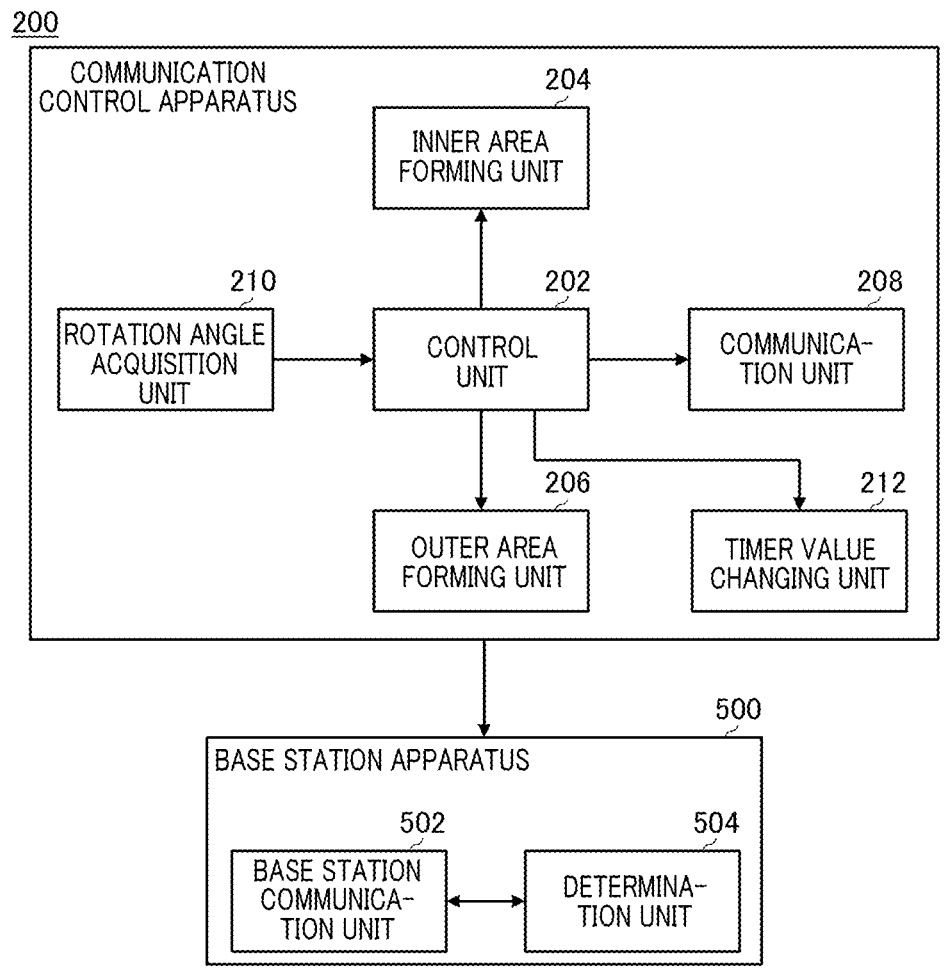
FIG. 4 schematically shows another example of the functional configuration of the communication control apparatus 200.

FIG. 4 schematically shows another example of the functional configuration of the communication control apparatus 200. Here, a case where the communication control apparatus 200 executes communication control by using a base station apparatus 500 mounted on the flying body 100 and complying with 3GPP is described.

The base station apparatus 500 includes a base station communication unit 502 and a determination unit 504. The base station communication unit 502 has a communication function complying with 3GPP. The base station communication unit 502 has a function of forming a wireless communication area on the ground by causing the antenna included on the flying body 100 to apply a beam toward the ground.

The determination unit 504 is configured to determine a timing advance value based on a time after a timing advance command is transmitted to the user terminal 30 until a response from the user terminal 30 is received. The determination unit 504 is configured to determine the timing advance value when a response is received from the user terminal 30 before an elapsed time after the timing advance command is transmitted to the user terminal 30 exceeds a predetermined timer value, and to determine a time-out when the elapsed time exceeds the timer value.

The communication control apparatus 200 exemplified in FIG. 4 includes a timer value changing unit 212, in addition to a control unit 202, an inner area forming unit 204, an outer area forming unit 206, a communication unit 208 and a rotation angle acquisition unit 210.

The inner area forming unit 204 may be configured to form the inner wireless communication area 130 by controlling the base station apparatus 500. The inner area forming unit 204 may be configured to form the inner wireless communication area 130 by controlling the base station communication unit 502.

The outer area forming unit 206 may be configured to form the outer wireless communication area 140 by controlling the base station apparatus 500. The outer area forming unit 206 may be configured to form the outer wireless communication area 140 by controlling the base station communication unit 502.

The timer value changing unit is configured to set a length of a timer value, which is used when the determination unit 504 transmits the timing advance command to a user terminal located in the outer peripheral cell, longer than a length of a timer value, which is used when the determination unit 504 transmits the timing advance command to a user terminal located in the inner wireless communication area 130. Thereby, it is possible to avoid a situation where the determination unit 504 determines a time-out for the user terminal 30 located in the outer peripheral cell.

Figure 5:
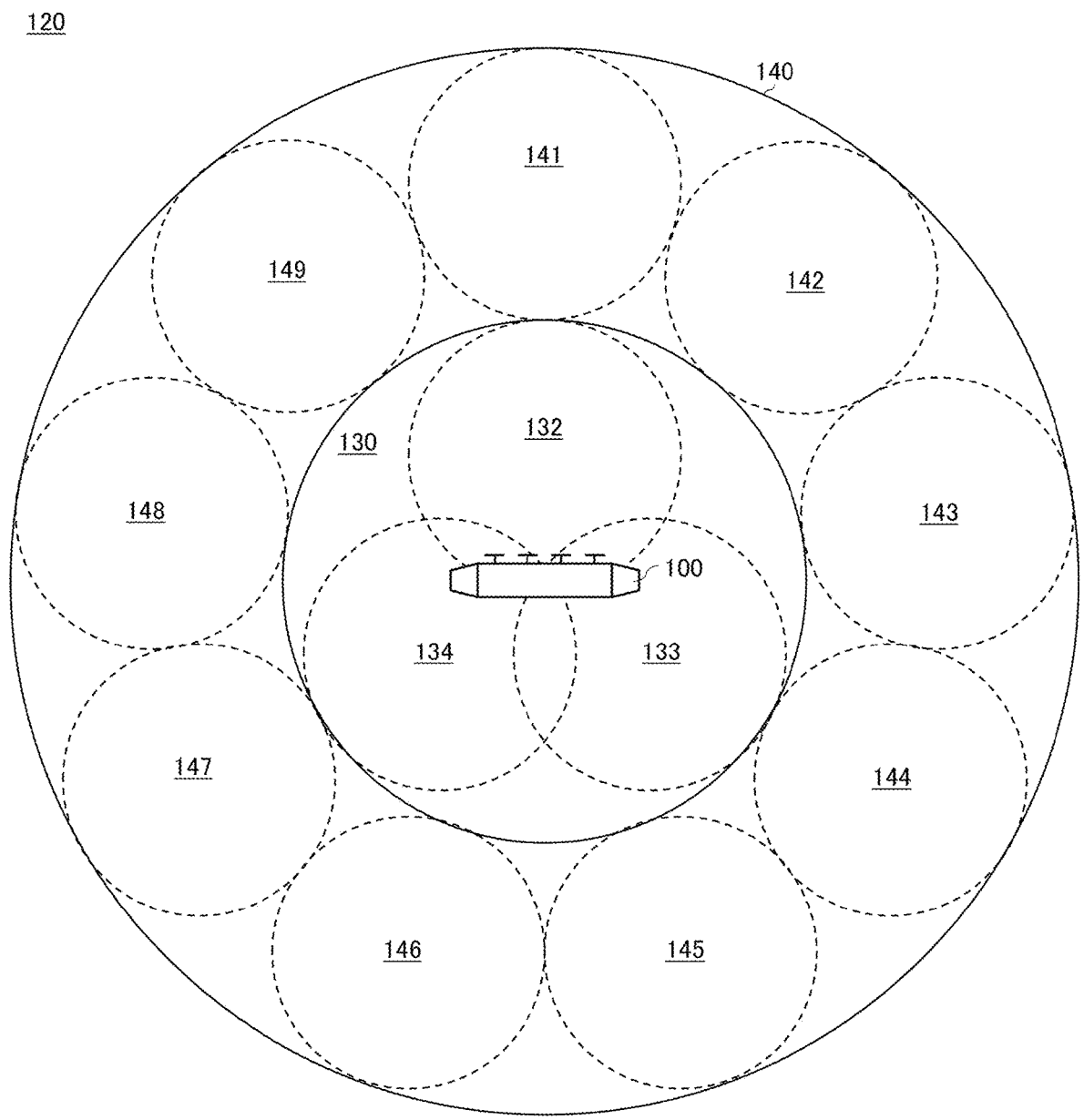
FIG. 5 schematically shows an example of the wireless communication area 120 that is formed by the flying body 100.

FIG. 5 schematically shows an example of the wireless communication area 120 that is formed by the flying body 100. Here, a case where the inner wireless communication area 130 is constituted by three cells is exemplified.

The inner wireless communication area 130 is constituted by an inner peripheral cell 132, an inner peripheral cell 133 and an inner peripheral cell 134. When the inner wireless communication area 130 is constituted by three cells, a cover area of the inner peripheral cells and a cover area of the outer peripheral cells are approximated. Therefore, it is possible to provide uniform communication capacity and link budget as a whole.

Figure 6:
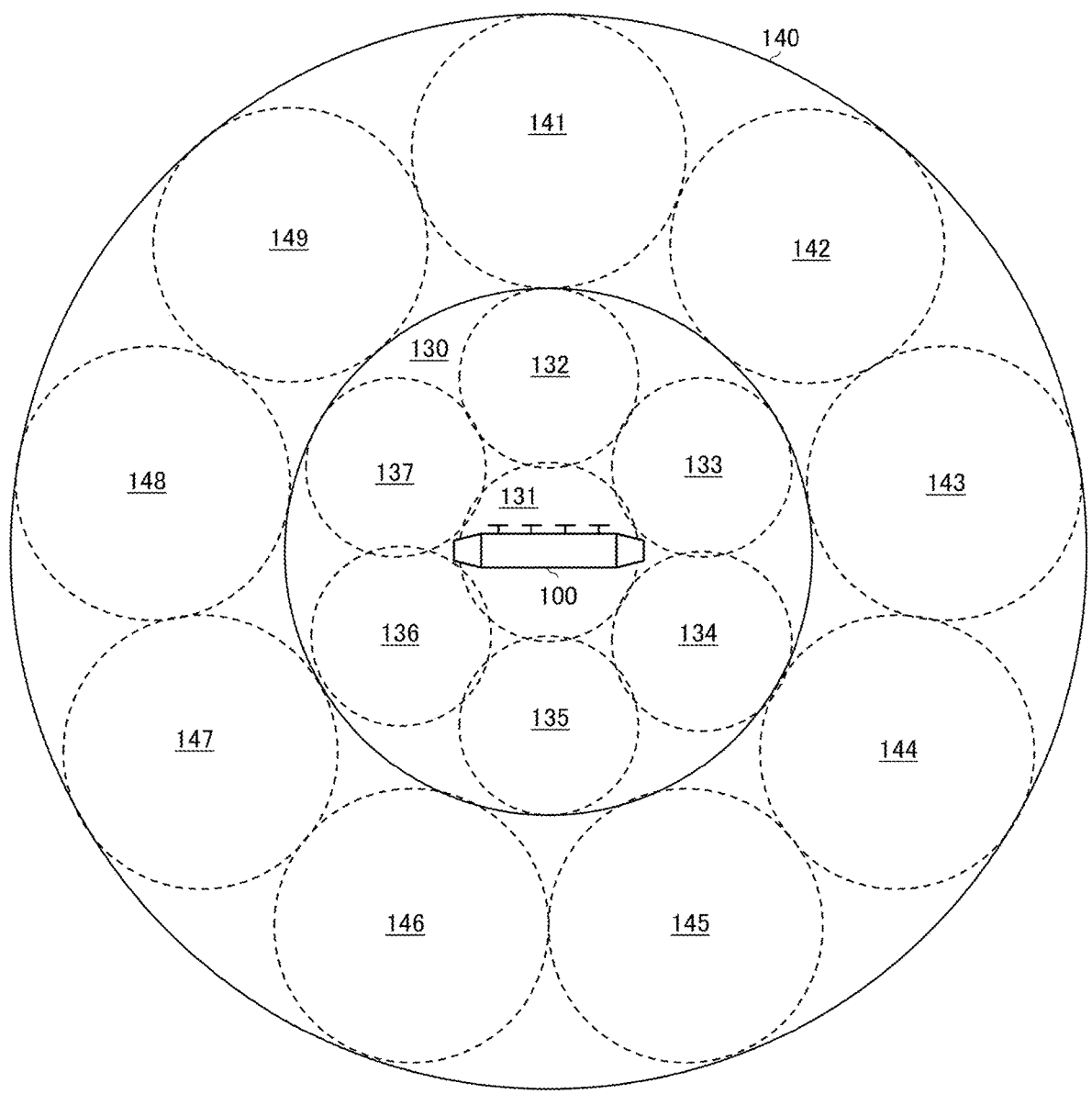
FIG. 6 schematically shows an example of the wireless communication area 120 that is formed by the flying body 100.

FIG. 6 schematically shows an example of the wireless communication area 120 that is formed by the flying body 100. Here, a case where the inner wireless communication area 130 is constituted by seven cells is exemplified. In the example shown in FIG. 6, the inner wireless communication area 130 is constituted by a center cell 131, an inner peripheral cell 132, an inner peripheral cell 133, an inner peripheral cell 134, an inner peripheral cell 135, an inner peripheral cell 136 and an inner peripheral cell 137.

In the case where the inner wireless communication area 130 is constituted by seven cells, the communication capacity in the inner wireless communication area 130 can be increased more than the communication capacity in the outer wireless communication area 140. This configuration is effective when covering an urban area and a surrounding area of the urban area.

Figure 7:
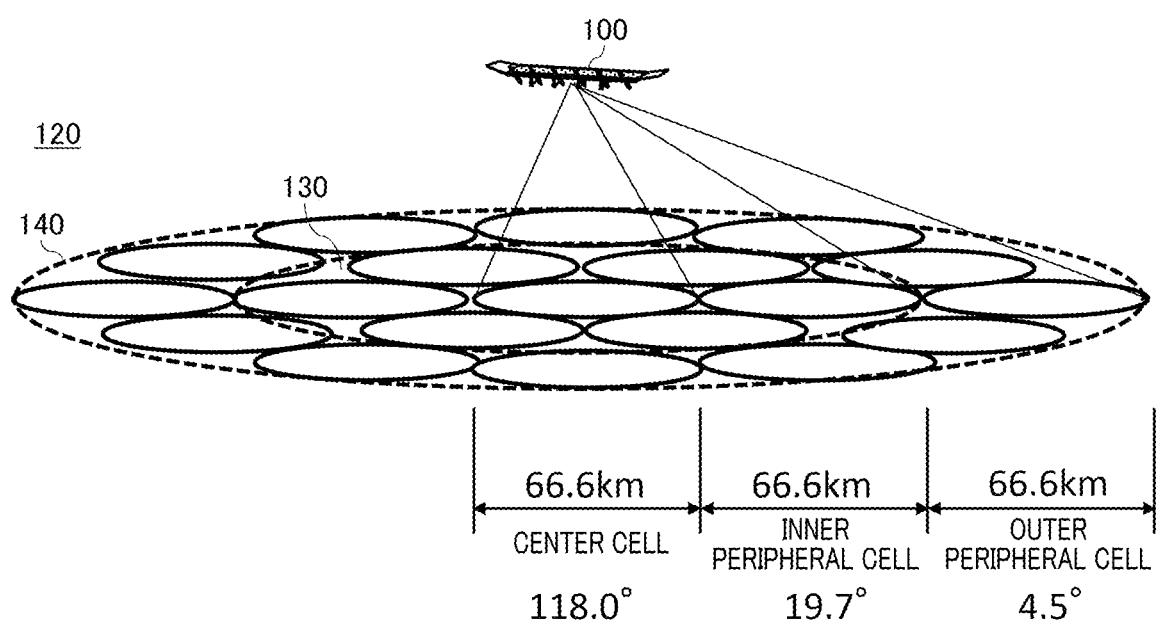
FIG. 7 schematically shows an example of the wireless communication area 120 that is formed by the flying body 100.

FIG. 7 schematically shows an example of the wireless communication area 120 that is formed by the flying body 100. Here, a case where the inner wireless communication area 130 is constituted by seven cells, the outer wireless communication area 140 is constituted by twelve cells and sizes of the nineteen cells are set to be the same is exemplified. In the example shown in FIG. 7, a diameter of the center cell, a diameter of the inner peripheral cell and a diameter of the outer peripheral cell are each 66.6 km.

Figure 8:
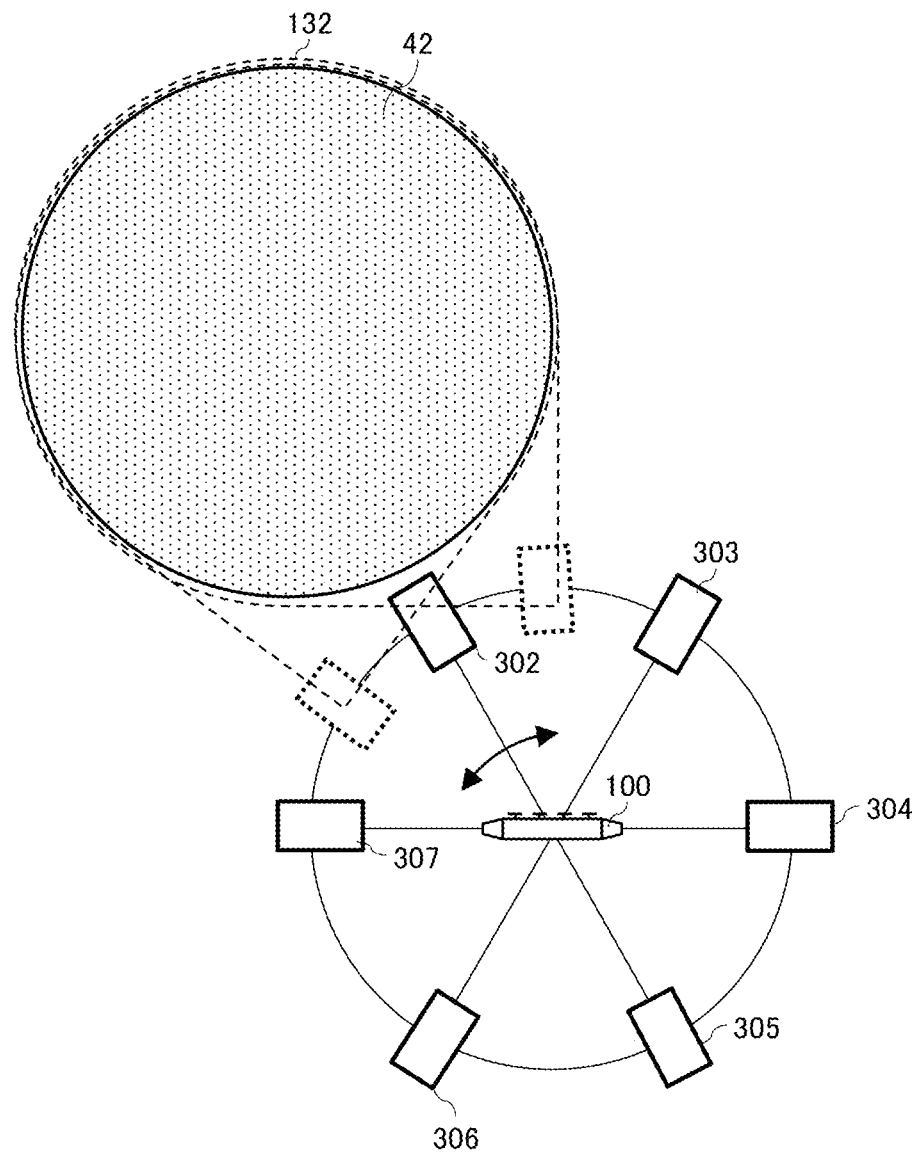
FIG. 8 illustrates a control content by an inner area forming unit 204.
Figure 9:
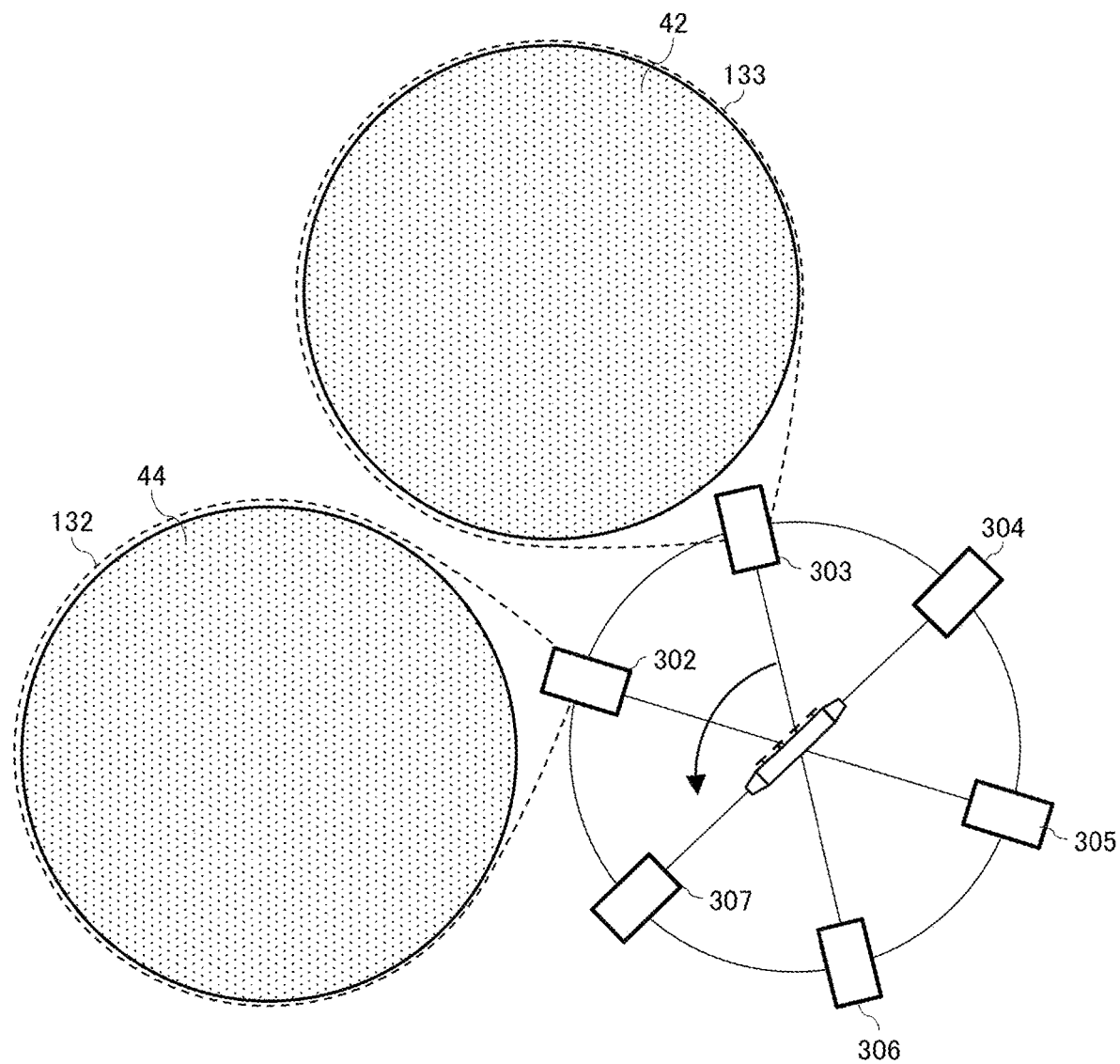
FIG. 9 illustrates the control content by the inner area forming unit 204.

FIGS. 8 and 9 illustrate control contents by the inner area forming unit 204. Here, in a case where six inner peripheral cells are formed by an antenna 302, an antenna 303, an antenna 304, an antenna 305, an antenna 306 and an antenna 307, a cover situation of a ground area 42 by the inner peripheral cell 132 that is formed by the antenna 302 is schematically shown.

The inner area forming unit 204 is configured to change a direction of a beam, which is applied from the antenna 302, so as to prevent the inner peripheral cell 132 from being moved with respect to the ground area 42 when the flying body 100 rotates in the lateral direction. The inner area forming unit 204 may be configured to change the direction of the beam, which is applied from the antenna 302, so as to prevent the inner peripheral cell 132 from being moved with respect to the ground area 42 while a rotation angle of the flying body 100 does not exceed a predetermined angle.

As exemplified in FIG. 8, the inner area forming unit 204 changes the direction of the beam applied from the antenna 302, so that it is possible to prevent the inner peripheral cell 132 from being moved with respect to the ground area 42. Thereby, in particular, it is possible to reduce a possibility that communication cutoff frequently occurs or handover frequently occurs in the user terminal 30 located on an outer edge of the ground area 42.

The inner area forming unit 204 may be configured to switch ground areas respectively covered by a plurality of inner peripheral cells each time the flying body 100 rotates in the lateral direction by a predetermined angle. The predetermined angle may be, for example, an angle obtained by dividing 360 degrees by the number of antennas for a plurality of inner peripheral cells. In the examples shown in FIGS. 8 and 9, the predetermined angle may be 60 degrees.

FIG. 9 exemplifies a case where the flying body 100 rotates leftward by the predetermined angle or greater, so that the inner area forming unit 204 changes the direction of the beam applied from the antenna 302 so that the inner peripheral cell 132 formed by the antenna 302 covering the ground area 42 covers a ground area 44 leftward adjacent to the ground area 42. The inner area forming unit 204 may also be configured to change a direction of a beam applied from the antenna 303 so as to cover the ground area 42, which is covered by the inner peripheral cell 132, by the inner peripheral cell 133 formed by the antenna 303 adjacent to the antenna 302. Thereby, it is possible to reduce a beam forming angle of each antenna, to increase the degree of freedom of antenna design, and to provide service by a small antenna.

Figure 10:
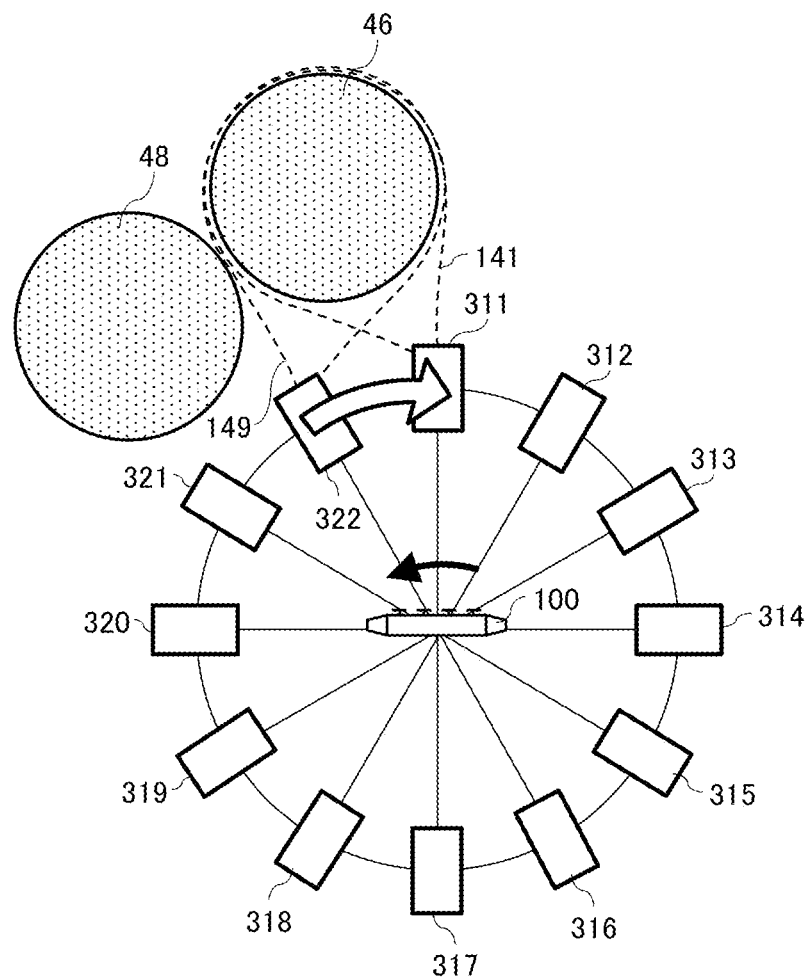
FIG. 10 illustrates a control content by an outer area forming unit 206.

FIG. 10 illustrates the control content by the outer area forming unit 206. Here, in a case where twelve outer peripheral cells are formed by an antenna 311, an antenna 312, an antenna 313, an antenna 314, an antenna 315, an antenna 316, an antenna 317, an antenna 318, an antenna 319, an antenna 320, an antenna 321 and an antenna 322, a cover situation of the ground area 46 by the outer peripheral cell 149 that is formed by the antenna 322 and the outer peripheral cell 141 that is formed by the antenna 311 is schematically shown.

The outer area forming unit 206 may be configured to change a direction of a beam, which is applied from the antenna 322, so as to prevent the outer peripheral cell 149 from being moved with respect to the ground area 46 while a rotation angle of the flying body 100 does not exceed a predetermined angle when the flying body 100 rotates in the lateral direction. The predetermined angle may be, for example, an angle obtained by dividing 360 degrees by the number of antennas for outer peripheral cells. In the examples shown in FIG. 10, the predetermined angle may be 30 degrees.

When the rotation angle of the flying body 100 exceeds the predetermined angle, the outer area forming unit 206 may be configured to change the direction of the beam applied from the antenna 322 so as to cover the ground area 48 adjacent to the ground area 46 by the outer peripheral cell 149 and to change the direction of the beam applied from the antenna 311 so as to cover the ground area 46 by the outer peripheral cell 141.

Figure 11:
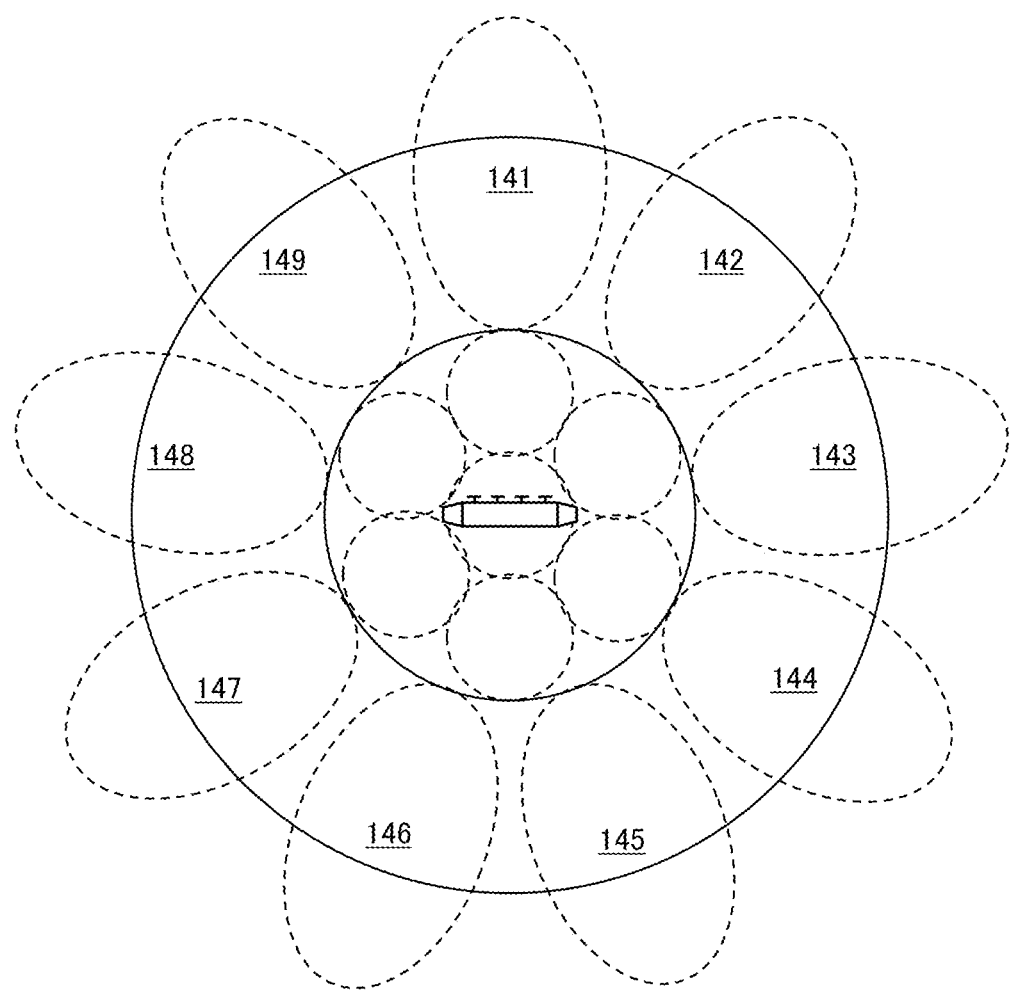
FIG. 11 illustrates the control content by the outer area forming unit 206.

FIG. 11 illustrates the control content by the outer area forming unit 206. When applying a beam for forming an outer peripheral cell, if the beam is applied in a similar manner to a beam for forming an inner peripheral cell, the outer peripheral cell becomes super-elliptical, as exemplified in FIG. 11.

The outer area forming unit 206 of the present embodiment is configured to cause an antenna to output a beam whose length in a first direction facing from the antenna toward the outer peripheral cell is shorter than a length in a second direction orthogonal to the first direction. Thereby, it is possible to form an outer peripheral cell having a perfect circle shape on the ground.

Figure 12:
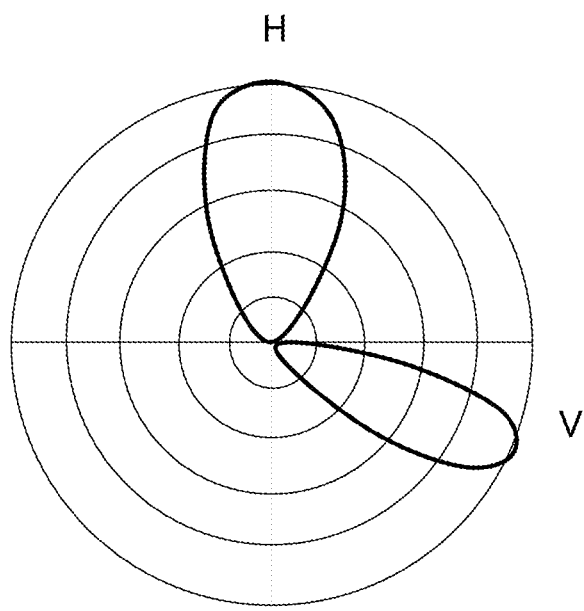
FIG. 12 schematically shows an example of an antenna pattern 172 for an inner peripheral cell.
Figure 13:
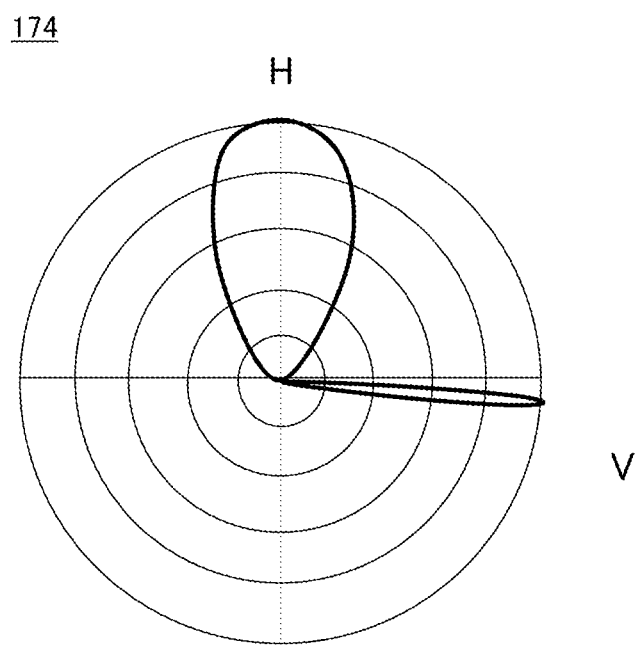
FIG. 13 schematically shows an example of an antenna pattern 174 for an outer peripheral cell.

FIG. 12 schematically shows an example of an antenna pattern 172 for an inner peripheral cell. FIG. 13 schematically shows an example of an antenna pattern 174 for an outer peripheral cell. As exemplified in FIGS. 12 and 13, an antenna for forming an outer peripheral cell may be an antenna having a narrower angle in a vertical direction than an antenna for forming an inner peripheral cell.

Figure 14:
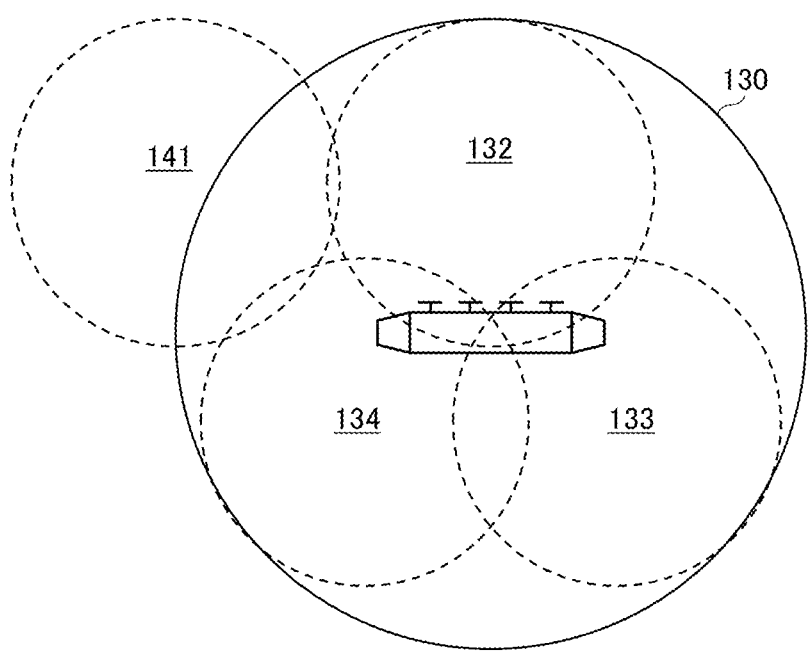
FIG. 14 schematically shows an example of the wireless communication area 120 that is formed by the flying body 100.
Figure 15:
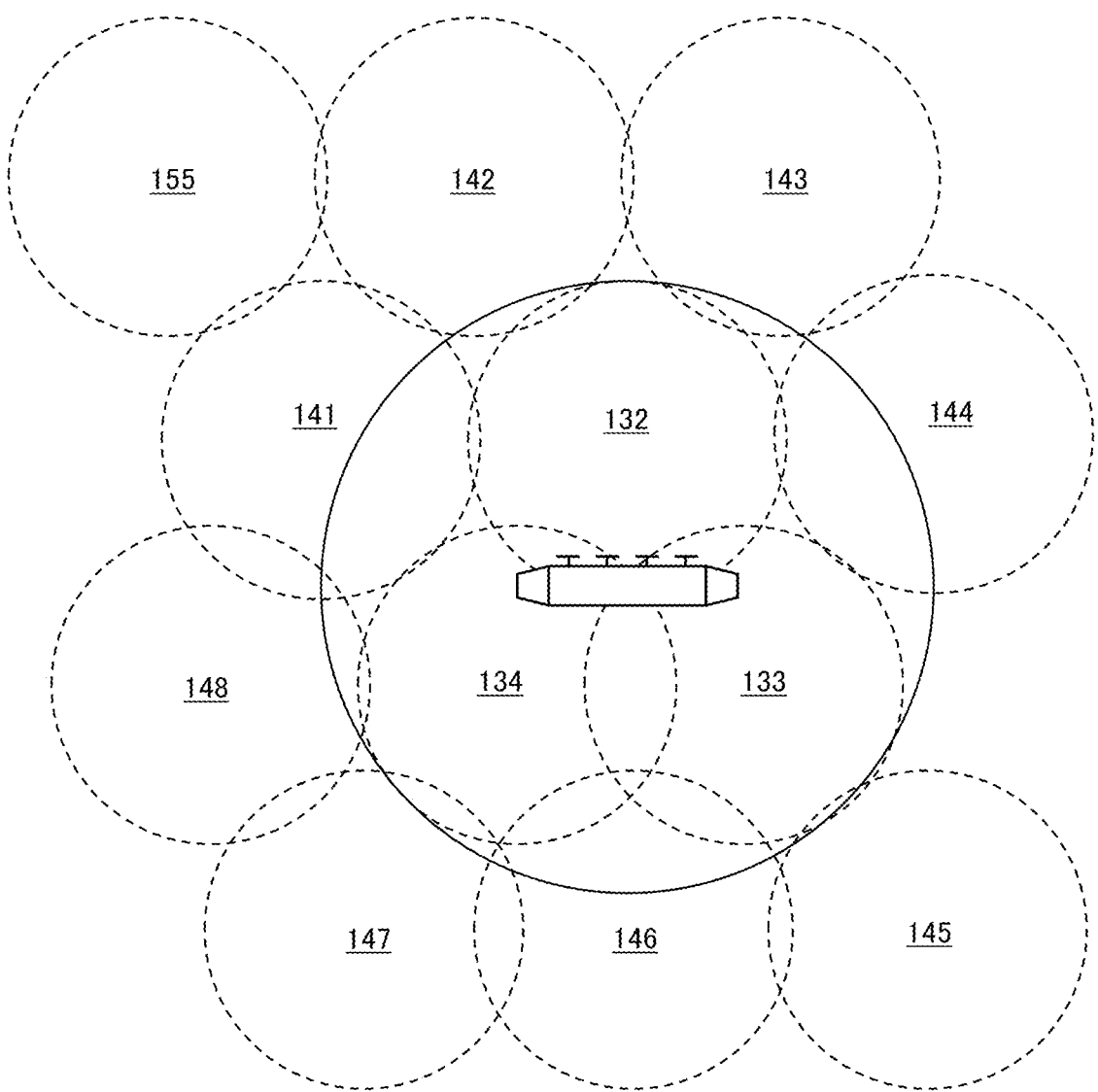
FIG. 15 schematically shows an example of the wireless communication area 120 that is formed by the flying body 100.

FIG. 14 and FIG. 15 schematically show examples of the wireless communication area 120 that is formed by the flying body 100. As shown in FIGS. 14 and 15, the flying body 100 may be configured to implement a cell design by zigzag arrangement.

In the example shown in FIG. 14, the inner area forming unit 204 forms the inner wireless communication area 130 constituted by the inner peripheral cell 132, the inner peripheral cell 133 and the inner peripheral cell 134, and the outer area forming unit 206 forms the outer peripheral cell 141.

In the example shown in FIG. 15, the inner area forming unit 204 forms the inner wireless communication area 130 constituted by the inner peripheral cell 132, the inner peripheral cell 133 and the inner peripheral cell 134, and the outer area forming unit 206 forms the outer peripheral cell 141, the outer peripheral cell 142, the outer peripheral cell 143, the outer peripheral cell 144, the outer peripheral cell 145, the outer peripheral cell 146, the outer peripheral cell 147 and the outer peripheral cell 148, and also forms a cell 155 having a radius of 50 km or shorter and adjacent to the outer peripheral cell 141 and the outer peripheral cell 142, on outer sides of the outer peripheral cell 141 and the outer peripheral cell 142.

By implementing the cell design by zigzag arrangement as exemplified in FIGS. 14 and 15, it is possible to facilitate the design when completely and continuously covering a large area.

Figure 16:
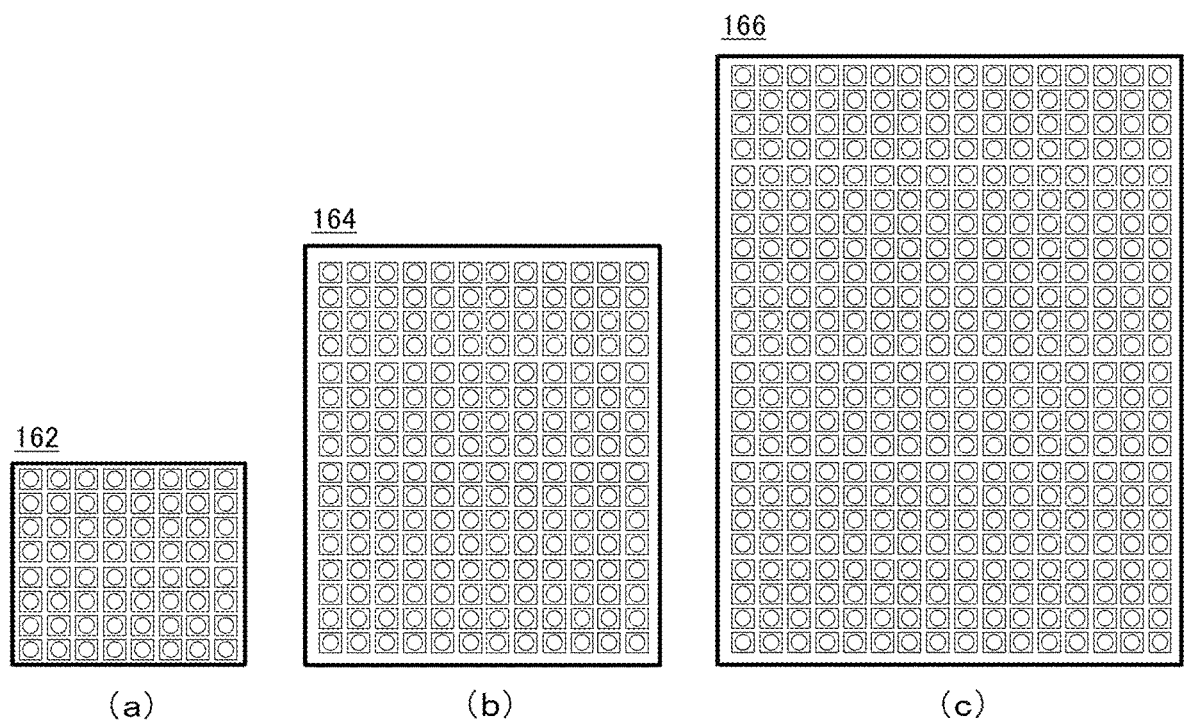
FIG. 16 schematically shows examples of an antenna 162, an antenna 164 and an antenna 166.

FIG. 16 schematically shows examples of an antenna 162, an antenna 164 and an antenna 166. The part (a) of FIG. 16 shows an antenna 162 for a center cell. The part (b) of FIG. 16 shows an antenna 164 for an inner peripheral cell. The part (c) of FIG. 16 shows an antenna 166 for an outer peripheral cell.

As shown in the parts (a), (b) and (c) of FIG. 16, in order to adopt antennas respectively optimized for service areas, an antenna having a larger size may be adopted as the antenna for forming a cell in a position more distant from the flying body 100.

Figure 17:
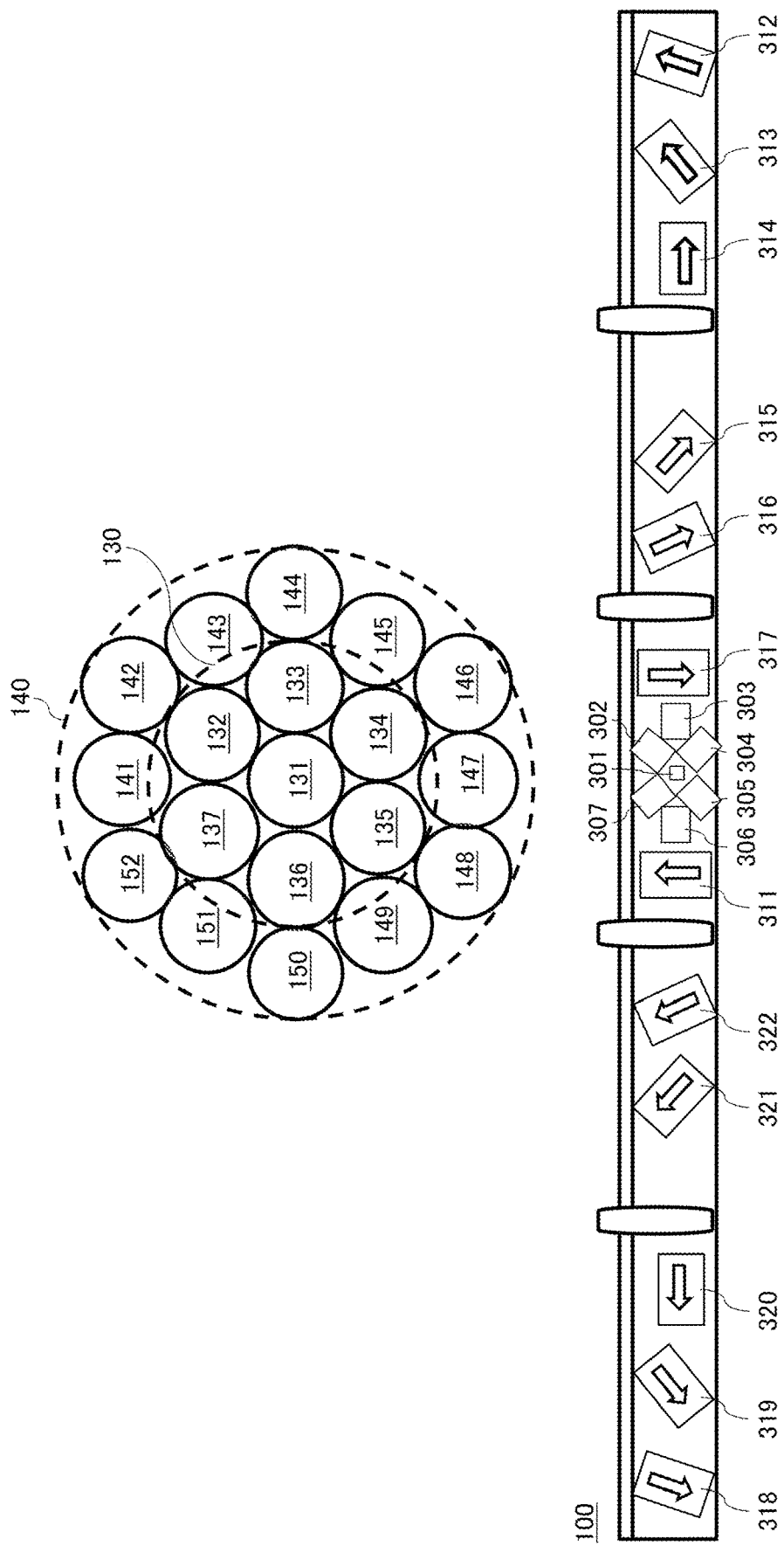
FIG. 17 schematically shows an example of an antenna configuration of the flying body 100.

FIG. 17 schematically shows an example of an antenna configuration of the flying body 100. FIG. 17 exemplifies an antenna configuration when the flying body 100 forms the inner wireless communication area 130 constituted by seven cells and the outer wireless communication area 140 constituted by twelve cells.

In the example shown in FIG. 17, the flying body 100 includes the antenna 301, the antenna 302, the antenna 303, the antenna 304, the antenna 305, the antenna 306 and the antenna 307, as antennas for the inner wireless communication area 130. The flying body 100 also includes the antenna 311, the antenna 312, the antenna 313, the antenna 314, the antenna 315, the antenna 316, the antenna 317, the antenna 318, the antenna 319, the antenna 320, the antenna 321 and the antenna 322, as antennas for the outer wireless communication area 140.

The inner area forming unit 204 may be configured to form the center cell 131 by the antenna 301. The inner area forming unit 204 may be configured to form the inner peripheral cell 132 by the antenna 302. The inner area forming unit 204 may be configured to form the inner peripheral cell 133 by the antenna 303. The inner area forming unit 204 may be configured to form the inner peripheral cell 134 by the antenna 304. The inner area forming unit 204 may be configured to form the inner peripheral cell 135 by the antenna 305. The inner area forming unit 204 may be configured to form the inner peripheral cell 136 by the antenna 306. The inner area forming unit 204 may be configured to form the inner peripheral cell 137 by the antenna 307.

As shown in FIG. 17, the antenna 302, the antenna 303, the antenna 304, the antenna 305, the antenna 306 and the antenna 307 may be equipped on the flying body 100 at equipment angles corresponding to positions of the inner peripheral cells to be formed. Thereby, it is possible to facilitate beam steering, as compared to a case where the equipment angles are not provided.

The outer area forming unit 206 may be configured to form the outer peripheral cell 141 by the antenna 311. The outer area forming unit 206 may be configured to form the outer peripheral cell 142 by the antenna 312. The outer area forming unit 206 may be configured to form the outer peripheral cell 143 by the antenna 313. The outer area forming unit 206 may be configured to form the outer peripheral cell 144 by the antenna 314. The outer area forming unit 206 may be configured to form the outer peripheral cell 145 by the antenna 315. The outer area forming unit 206 may be configured to form the outer peripheral cell 146 by the antenna 316. The outer area forming unit 206 may be configured to form the outer peripheral cell 147 by the antenna 317. The outer area forming unit 206 may be configured to form the outer peripheral cell 148 by the antenna 318. The outer area forming unit 206 may be configured to form the outer peripheral cell 149 by the antenna 319. The outer area forming unit 206 may be configured to form the outer peripheral cell 150 by the antenna 320. The outer area forming unit 206 may be configured to form the outer peripheral cell 151 by the antenna 321. The outer area forming unit 206 may be configured to form the outer peripheral cell 152 by the antenna 322.

As shown in FIG. 17, the antenna 311, the antenna 312, the antenna 313, the antenna 314, the antenna 315, the antenna 316, the antenna 317, the antenna 318, the antenna 319, the antenna 320, the antenna 321 and the antenna 322 may be equipped on the flying body 100 at equipment angles corresponding to positions of the outer peripheral cells to be formed. Thereby, it is possible to facilitate beam steering, as compared to a case where the equipment angles are not provided.

Figure 18:
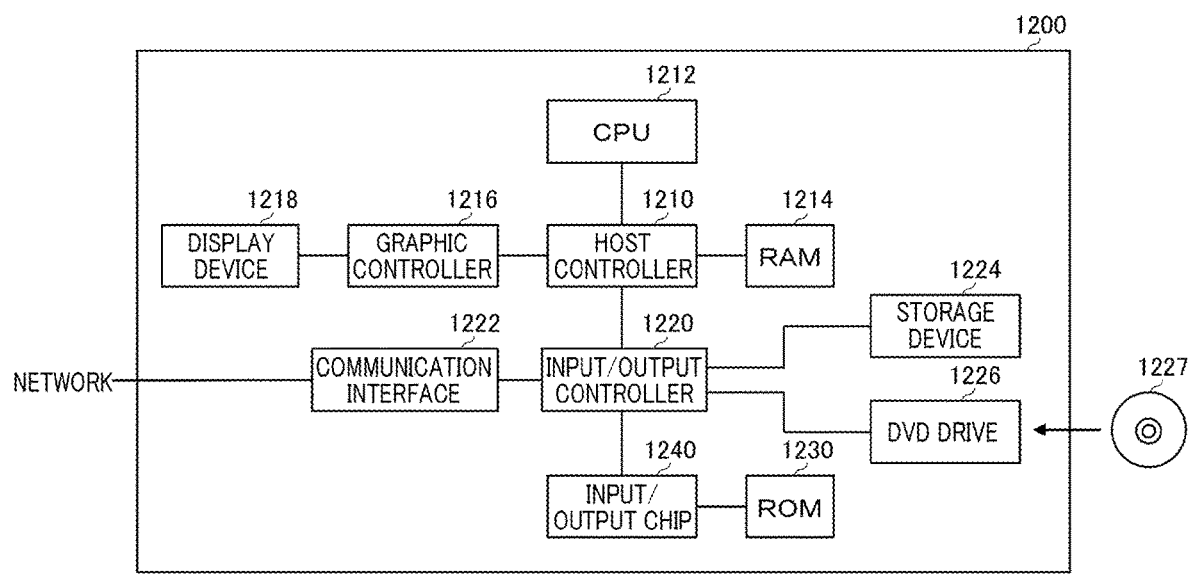
FIG. 18 schematically shows an example of a hardware configuration of a computer 1200 functioning as the communication control apparatus 200.

FIG. 18 schematically shows an example of a hardware configuration of a computer 1200 functioning as the communication control apparatus 200. A program that is installed in the computer 1200 can cause the computer 1200 to function as one or more sections of the apparatus of the present embodiment or cause the computer 1200 to execute operations associated with the apparatus of the present embodiment or the one or more sections, and/or cause the computer 1200 to execute the process of the present embodiment or steps thereof. Such program may be executed by a CPU 1212 so as to cause the computer 1200 to execute certain operations associated with some or all of the blocks of flowcharts and block diagrams described herein.

The computer 1200 according to the present embodiment includes a CPU 1212, a RAM 1214, and a graphic controller 1216, which are mutually connected by a host controller 1210. The computer 1200 also includes input/output units such as a communication interface 1222, a storage device 1224, a DVD drive 1226 and an IC card drive, which are connected to the host controller 1210 via an input/output controller 1220. The DVD drive 1226 may be a DVD-ROM drive, a DVD-RAM drive and the like. The storage device 1224 may be a hard disk drive, a solid state drive and the like. The computer 1200 also includes legacy input/output units such as a ROM 1230 and a keyboard, which are connected to the input/output controller 1220 via an input/output chip 1240.

The CPU 1212 is configured to operate according to programs stored in the ROM 1230 and the RAM 1214, thereby controlling each unit. The graphic controller 1216 is configured to acquire image data generated by the CPU 1212 on a frame buffer or the like provided in the RAM 1214 or in itself, and to cause the image data to be displayed on a display device 1218.

The communication interface 1222 is configured to communicate with other electronic devices via a network. The storage device 1224 is configured to store programs and data that are used by the CPU 1212 within the computer 1200. The DVD drive 1226 is configured to read the programs or the data from the DVD-ROM 1227 and the like, and to provide the storage device 1224 with the programs or the data. The IC card drive is configured to read programs and data from an IC card, and/or to write programs and data into the IC card.

The ROM 1230 is configured to store therein a boot program or the like that is executed by the computer 1200 at the time of activation, and/or a program depending on the hardware of the computer 1200. The input/output chip 1240 may also be configured to connect various input/output units to the input/output controller 1220 via a USB port, a parallel port, a serial port, a keyboard port, a mouse port or the like.

A program is provided by a computer-readable storage medium such as the DVD-ROM 1227 or the IC card. The program is read from the computer-readable storage medium, is installed into the storage device 1224, the RAM 1214 or the ROM 1230, which are also examples of the computer-readable storage medium, and is executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from the network to a reception buffer region or the like provided on the recording medium.

In addition, the CPU 1212 may be configured to cause all or a necessary portion of a file or a database, which has been stored in an external recording medium such as the storage device 1224, the DVD drive 1226 (DVD-ROM 1227) and the IC card, to be read into the RAM 1214, thereby executing various types of processing on the data on the RAM 1214. The CPU 1212 is configured to write back the processed data to the external recording medium.

Various types of information, such as various types of programs, data, tables, and databases, may be stored in the recording medium to undergo information processing. The CPU 1212 may also be configured to execute various types of processing on the data read from the RAM 1214, which includes various types of operations, processing of information, condition judging, conditional branching, unconditional branching, search/replacement of information and the like described in the present disclosure and designated by an instruction sequence of programs, and to write the result back to the RAM 1214. The CPU 1212 may also be configured to search for information in a file, a database, etc., in the recording medium. For example, when a plurality of entries, each having an attribute value of a first attribute associated with an attribute value of a second attribute, is stored in the recording medium, the CPU 1212 may search for an entry matching the condition whose attribute value of the first attribute is designated, from the plurality of entries, and read the attribute value of the second attribute stored in the entry, thereby obtaining the attribute value of the second attribute associated with the first attribute satisfying the predetermined condition.

The above-described program or software modules may be stored in the computer-readable storage medium on or near the computer 1200. In addition, a recording medium such as a hard disk or a RAM provided in a server system connected to a dedicated communication network or the Internet can be used as the computer-readable storage medium, thereby providing the programs to the computer 1200 via the network.

In the present embodiment, blocks of the flowcharts and the block diagrams may represent steps of processes in which operations are executed or sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include, for example, reconfigurable hardware circuits comprising logical AND, OR, XOR, NAND, NOR, and other logical operations, flip-flops, registers, and memory elements, such as field-programmable gate arrays (FPGA) and programmable logic arrays (PLA).

Computer-readable storage media may include any tangible device that can store instructions for execution by a suitable device, such that the computer-readable storage medium having instructions stored therein includes an article of manufacture including instructions which can be executed to create means for performing operations specified in the flowcharts or block diagrams. Examples of computer-readable storage media may include an electronic storage medium, a magnetic storage medium, an optical storage medium, an electromagnetic storage medium, a semiconductor storage medium, etc. More specific examples of computer-readable storage media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark) and C++, and conventional procedural programming languages, such as the "C" programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry performs the computer-readable instructions to create means for performing operations specified in the flowcharts or block diagrams. Examples of processors include computer processors, processing units, microprocessors, digital signal processors, controllers, microcontrollers, etc.

While the present invention has been described using the embodiments, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, stages and the like of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20: network, 22: gateway, 30: user terminal, 42: ground area, 44: ground area, 46: ground area, 48: ground area, 50: communication satellite, 100: flying body, 102: main body, 104: main wing, 106: propeller, 108: skid, 110: wheel, 112: solar cell panel, 120: wireless communication area, 130: inner wireless communication area, 131: center cell, 132, 133, 134: inner peripheral cell, 140: outer wireless communication area, 141, 142, 143, 144, 145, 146, 147, 148, 149, 150, 151, 152: outer peripheral cell, 155: cell, 162: antenna, 164: antenna, 166: antenna, 172: antenna pattern, 174: antenna pattern, 200: communication control apparatus, 202: control unit, 204: inner area forming unit, 206: outer area forming unit, 208: communication unit, 210: rotation angle acquisition unit, 212: timer value changing unit, 301, 302, 303, 304, 305, 306, 307: antenna, 311, 312, 313, 314, 315, 316, 317, 318, 319, 320, 321, 322: antenna, 400: management apparatus, 500: base station apparatus, 502: base station communication unit, 504: determination unit, 1200: computer, 1210: host controller, 1212: CPU, 1214: RAM, 1216: graphic controller, 1218: display device, 1220: input/output controller, 1222: communication interface, 1224: storage device, 1226: DVD drive, 1227: DVD-ROM, 1230: ROM, 1240: input/output chip

What is claimed is:

1. A communication control apparatus configured to control communication of a flying body configured to form a wireless communication area by applying a beam toward ground to provide wireless communication service for at least one user terminal in the wireless communication area, the communication control apparatus comprising:
    an inner area forming unit configured to form an inner wireless communication area having a radius of about 100 km or shorter; and
    an outer area forming unit configured to form, on an outer side of the inner wireless communication area, an outer wireless communication area constituted by at least one outer peripheral cell,
    wherein the at least one outer peripheral cell has a radius of about 50 km or shorter, and
    wherein the radius of the at least one outer peripheral cell is smaller than the radius of the inner wireless communication area.

2. The communication control apparatus according to claim 1, wherein
    the inner area forming unit is configured to adjust a beam for forming the inner wireless communication area so that the radius of the inner wireless communication area does not exceed about 100 km.

3. The communication control apparatus according to claim 1, wherein
    the outer area forming unit is configured to adjust a beam for forming the at least one outer peripheral cell so that the radius of the outer peripheral cell does not exceed about 50 km.

4. The communication control apparatus according to claim 1, wherein
    the outer area forming unit is configured to form, on the outer side of the inner wireless communication area, the outer wireless communication area constituted by the at least one outer peripheral cell, wherein the at least one outer peripheral cell is a plurality of outer peripheral cells.

5. The communication control apparatus according to claim 4, wherein
    the outer area forming unit is configured to form the outer wireless communication area surrounding the inner wireless communication area.

6. The communication control apparatus according to claim 4, wherein
    the outer area forming unit is configured to change directions of a plurality of beams for forming the plurality of outer peripheral cells, so as to prevent the plurality of outer peripheral cells respectively covering a plurality of ground areas from being moved when the flying body rotates in a lateral direction.

7. The communication control apparatus according to claim 6, wherein
    the outer area forming unit is configured to switch the plurality of ground areas respectively covered by the plurality of outer peripheral cells each time the flying body rotates in the lateral direction by a predetermined angle.

8. The communication control apparatus according to claim 7, wherein
the outer area forming unit is configured to change a direction of a beam for forming a first cell of the plurality of outer peripheral cells so that, when the flying body rotates in a first lateral direction by the predetermined angle, the first cell that has been covering a first ground area of the plurality of ground areas switches to cover a second ground area of the plurality of ground areas adjacent to the first ground area in the first lateral direction.

9. The communication control apparatus according to claim 1, wherein
the inner area forming unit is configured to form the inner wireless communication area constituted by a plurality of inner cells.

10. The communication control apparatus according to claim 9, wherein
the inner area forming unit is configured to form the inner wireless communication area constituted by the plurality of inner cells comprising a center cell and a plurality of surrounding cells surrounding the center cell.

11. The communication control apparatus according to claim 9, wherein
the plurality of inner cells comprises at least three cells.

12. The communication control apparatus according to claim 9, wherein
the inner area forming unit is configured to change directions of a plurality of beams for forming the plurality of inner cells, so as to prevent the plurality of inner cells respectively covering a plurality of ground areas from being moved when the flying body rotates in a lateral direction.

13. The communication control apparatus according to claim 12, wherein
the inner area forming unit is configured to switch the plurality of ground areas respectively covered by the plurality of inner cells each time the flying body rotates in the lateral direction by a predetermined angle.

14. The communication control apparatus according to claim 12, wherein
the inner area forming unit is configured to change a direction of a beam for forming a first cell of the plurality of outer peripheral cells so that, when the flying body rotates in the lateral direction by a predetermined angle, the first cell that has been covering a first ground area switches to cover a second ground area adjacent to the first ground area in the lateral direction.

15. The communication control apparatus according to claim 1, wherein
the outer area forming unit is configured to form, on the ground, the at least one outer peripheral cell having a substantially circle shape by outputting a beam whose length in a first direction from an antenna toward the at least one outer peripheral cell is shorter than a length in a second direction orthogonal to the first direction.

16. The communication control apparatus according to claim 1, wherein
the communication control apparatus is configured to control a base station apparatus complying with 3GPP,
the inner area forming unit is configured to form the inner wireless communication area by controlling the base station apparatus, and the outer area forming unit is configured to form the outer wireless communication area by controlling the base station apparatus.

17. The communication control apparatus according to claim 16, wherein
the base station apparatus includes a determination unit configured to determine a timing advance value based on a time from a timing advance command being transmitted to the at least one user terminal until a response from the at least one user terminal being received and to determine that it is a time-out when an elapsed time from the timing advance command being transmitted to the at least one user terminal exceeds a timer value, and
the communication control apparatus comprises a timer value changing unit configured to set a length of the timer value used when the determination unit transmits the timing advance command to at least one of the at least one user terminal located in the outer peripheral cell to be longer than a length of the timer value used when the determination unit transmits the timing advance command to at least one of the at least one user terminal located in the inner wireless communication area.

18. The communication control apparatus according to claim 1, wherein
the outer area forming unit is configured to further form, on an outer side of at least one of the at least one outer peripheral cell, a cell having a radius of 50 km or shorter and adjacent to the at least one outer peripheral cell.

19. A system comprising:
the communication control apparatus according to claim 1; and
the flying body.

20. A communication control apparatus configured to control communication of a flying body configured to form a wireless communication area by applying a beam toward ground to provide wireless communication service for at least one user terminal in the wireless communication area, the communication control apparatus comprising:
an area forming unit is configured to form a wireless communication area constituted by a plurality of cells respectively covering a plurality of ground areas, wherein the area forming unit is configured to change directions of a plurality of beams for forming the plurality of cells so as to prevent the plurality of cells on the ground from being moved when the flying body rotates in a lateral direction, wherein
the area forming unit is configured to switch the plurality of ground areas respectively covered by the plurality of cells each time the flying body rotates in the lateral direction by a predetermined angle.

21. The communication control apparatus according to claim 20, wherein
the area forming unit is configured to change a direction of a beam for forming a first cell of the plurality of cells so that, when the flying body rotates in the lateral direction by the predetermined angle, the first cell that has been covering a first ground area of the plurality of ground areas switches to cover a second ground area of the plurality of ground areas adjacent to the first ground area in the lateral direction.

22. A communication control apparatus configured to control communication of a flying body configured to form a wireless communication area by applying a beam toward ground to provide wireless communication service for at least one user terminal in the wireless communication area, the communication control apparatus comprising:

an area forming unit configured to form, on the ground, a cell having a substantially circle shape by outputting a beam whose length in a first direction from an antenna toward the cell is shorter than a length in a second direction orthogonal to the first direction, when forming, from a direction substantially below the flying body, the cell on the ground by a beam whose angle is greater than a predetermined angle.

23. A non-transitory computer-readable storage medium having stored thereon a program that causes a computer to function as:

a communication control apparatus configured to control communication of a flying body configured to form a wireless communication area by applying a beam toward ground to provide wireless communication service for at least one user terminal in the wireless communication area, the communication control apparatus comprising:

an inner area forming unit configured to form an inner wireless communication area having a radius of about 100 km or shorter; and an outer area forming unit configured to form, on an outer side of the inner wireless communication area, an outer wireless communication area constituted by at least one outer peripheral cell, wherein the at least one outer peripheral cell having a radius of about 50 km or shorter, and wherein the radius of the at least one outer peripheral cell is smaller than the radius of the inner wireless communication area.

24. A control method that is executed by a communication control apparatus configured to control communication of a flying body configured to form a wireless communication area by applying a beam toward the ground to provide wireless communication service for at least one user terminal in the wireless communication area, the control method comprising:

forming an inner wireless communication area having a radius of about 100 km or shorter; and forming, on an outer side of the inner wireless communication area, an outer wireless communication area constituted by at least one outer peripheral cell, wherein the at least one outer peripheral cell having a radius of about 50 km or shorter, and wherein the radius of the at least one outer peripheral cell is smaller than the radius of the inner wireless communication area.

* * * * *